(12) United States Patent
Hosono

(10) Patent No.: US 7,004,044 B2
(45) Date of Patent: Feb. 28, 2006

(54) TRANSMISSION

(75) Inventor: Kiyohito Hosono, Aichi (JP)

(73) Assignee: Aichi Machine Industry Co., Ltd., Aichi (JP)

( * ) Notice: Subject to any disclaimer, the term of this patent is extended or adjusted under 35 U.S.C. 154(b) by 11 days.

(21) Appl. No.: 10/494,317

(22) PCT Filed: Oct. 15, 2002

(86) PCT No.: PCT/JP02/10690

§ 371 (c)(1),
(2), (4) Date: Apr. 30, 2004

(87) PCT Pub. No.: WO03/038305

PCT Pub. Date: May 8, 2003

(65) Prior Publication Data

US 2005/0011292 A1    Jan. 20, 2005

(30) Foreign Application Priority Data

Oct. 31, 2001   (JP)   ............... 2001-333619

(51) Int. Cl.
*F16H 3/091* (2006.01)

(52) U.S. Cl. .......................... 74/339; 74/331

(58) Field of Classification Search ............... 74/339, 74/340, 337, 333
See application file for complete search history.

(56) References Cited

U.S. PATENT DOCUMENTS

| | | | | | |
|---|---|---|---|---|---|
| 5,720,203 | A | * | 2/1998 | Honda et al. ............ | 74/329 |
| 5,950,781 | A | * | 9/1999 | Adamis et al. ........... | 74/331 |
| 6,427,550 | B1 | * | 8/2002 | Bowen .................... | 74/339 |
| 6,895,832 | B1 | * | 5/2005 | Ishihara et al. .......... | 74/339 |
| 2004/0250638 | A1 | * | 12/2004 | Hosono .................... | 74/340 |

* cited by examiner

*Primary Examiner*—Sherry Estremsky
(74) *Attorney, Agent, or Firm*—Donald S. Dowden; Cooper & Dunham LLP

(57) ABSTRACT

A transmission, having a first input shaft X1, a second input shaft X2, an output shaft Xs and an idle shaft $X_R$, wherein two gears G1, G2 are carried on a sleeve $S_G$ fitted rotatably on said first input shaft X1, and one (G1) of said gears of said sleeve $S_G$ engages with a gear G16 being fixedly carried on said counter shaft Xs, while the other gear G2 engages with a gear G7 being fixedly carried on said output shaft Xo, and further, a coupling C1 is attached between said one (G1) of said gears and the other gear G2, to fix selectively said gear G1 or G2 to said input shaft X1, is provided in the present invention.

1 Claim, 3 Drawing Sheets

X1: First input shaft    X2: Second input shaft    Xo: Output shaft
Xs: Counter shaft    $X_R$: Idle shaft    D1: First clutch
D2: Second clutch    G1~G17: Gears    $S_G$: Sleeve
C1~C4: Couplings X1: First input shaft   X2: Second input shaft   Xo: Output shaft
Xs: Counter shaft       XR: Idle shaft            D1: First clutch
D2: Second clutch       G1~G17: Gears             SG: Sleeve
C1~C4: Couplings

TRANSMISSION

FIELD OF THE INVENTION

This invention relates to a twin clutch type automotive transmission.

BACKGROUND OF THE INVENTION

Up to now, a twin-clutch type transmission (1) has been provided, as shown in FIG. 3, having a first input shaft X1 connecting to a first clutch D1, a second input shaft X2, inserted in said first input shaft X1, connecting to a second clutch D2, an output shaft Xo, a counter shaft Xs, and an idle shaft $X_R$, wherein 4th and 6th speed drive gears G18, G19 are rotatably carried on said first input shaft X1, the 2nd drive gear G20 is fixedly carried on said first input shaft X1, and a coupling C5 to fix selectively said rotatable gears G18, G19 to said first input shaft X1 is attached between said two gears G18, G19, the 1st, 3rd, and 5th drive gears G21, G22, G23 are fixedly carried on said second input shaft X2, the 4th and 6th speed driven gears G24, G25 engaging respectively with said rotatable two gears G18, G19 of said first input shaft X1 are fixedly carried on said output shaft Xo, the 1st and 5th speed driven gears G26, G27 engaging respectively with said two fixed gears G21, G23 of said second input shaft X2 are rotatably carried on said output shaft Xo, an output gear G12 connecting to a differential gear(4) is fixedly carried on said output shaft Xo on the clutch-most side, and a coupling C6 to fix selectively two rotatable gears G26, G27 to said output shaft Xo is attached between said two gears, the 3rd speed driven gear G28 engaging with said gear G22 of said second input shaft X2 and a gear G30 connecting to said gear G21 of said second input shaft X2 through a gear G29 carried fixedly on said idle shaft $X_R$ are respectively rotatably carried on said counter shaft Xs, and a gear G31 engaging with said gear G18 of said first input shaft is fixedly carried on said counter shaft Xs, and the 2nd speed driven gear G32 engaging with said gear G20 of said first input shaft X1 is rotatably carried on said counter shaft Xo, furthermore, couplings C7, C8 to fix selectively three rotatable gears G28, G30, G32 to said counter shaft Xs are respectively attached between said gears G28 and G30, and to said gear G32.

In above described transmission (1), said gear G32 and said coupling C8 attached to said gear G32 are arranged in a side space SP of said output gear G12 of said output shaft Xo.

In said conventional transmission (1), to attain 2nd speed or 3rd speed or reverse, the 4th drive gear G18 of said first input shaft X1 is used as an idle gear, so that excessive load effects on said gear G18, and the mechanical strength of the bearing part of said gear G18 is insufficient, resulting in the degradation of the durability of said transmission (1).

Accordingly, to ensure the mechanical strength of the bearing part of said gear G18, increasing the diameter of the bearing part of said gear G18 to increase volume of the bearing part of said gear G18, has been considered, however, since the gear diameter of said gear G18 is settled by the gear ratio of the 4th drive gear G18 to the driven gear G24, in a case where the gear diameter of said gear G18 is settled to be large, the distance between said first input shaft X1 and said output Xo also increases, resulting in an oversized transmission, which is troublesome to install in an automobile. Furthermore, in a case where the shaft length of the bearing part of said gear G18 is enlarged to increase the volume of the bearing part of said gear G18, the shaft direction size of said transmission (1) is also enlarged, according to any enlargements of shaft length, thus causing trouble. In the case of twin clutch type transmission (1), particularly in the case of a front wheel drive system where the engine is installed sideways, narrowing the transmission installation space, the shaft length is difficult to accommodate in the space available.

Further, since the 2nd speed gear G20 of said first input shaft X1 is for a lower speed gear, the diameter of said gear is settled to be small, and the diameter of said first input shaft X1 is settled to be small, according to the diameter of said gear G20. Accordingly, the diameter of said second input shaft X2, inserted in said hollow, tube-like first input shaft X1, is necessary to be settled to be smaller, resulting in its mechanical strength being insufficient to degrade the durability of said transmission (1).

In this case, the diameter of said gear G20 is settled by the gear ratio of 2nd drive gear G20 to said driven gear G32, and in the case where the diameter of said gear G20 is enlarged, increasing the distance between said first input shaft X and said counter shaft Xs, the result is an enlarged transmission size, which is troublesome to install in an automobile, given the space provided therefor.

DISCLOSURE OF THE INVENTION

To solve above described problems in said conventional transmission, the present invention provide a transmission, having a first input shaft X1 connecting to a first clutch D1, a second input shaft X2, inserted in said first input shaft X1, connecting to a second clutch D2, an output shaft Xo, a counter shaft Xs and an idle shaft $X_R$, wherein a sleeve $S_G$ on which two gears G1, G2 are carried is rotatably fitted on said first input shaft X1, a gear G3 is rotatably carried on said first input shaft, and a gear G4 is fixedly carried on said first input shaft X1, and further, a coupling C1 to fix selectively one (G1) of said rotatable gears G1, G2 of said sleeve $S_G$ and said rotatable gear G3 of said first input shaft X1 to said first input shaft is attached between said rotatable gears G1 and G3, two gears G5, G6 are fixedly carried on said second input shaft X2, two gears G7, G8 engaging with the other rotatable gear G2 of said sleeve $S_G$ and said rotatable gear G3 of said first input shaft are respectively fixedly carried on said output shaft Xo, two gears G9, G10 engaging respectively with said two fixed gears G5, G6 of said second input shaft X2 are rotatably carried on said output shaft Xo, an output gear G12 connecting to a differencial gear (4) is fixedly carried on said output shaft Xo on the clutch—most side, and further, a coupling C2 to fix selectively said two rotatable gears G9, G10 to said output shaft Xo is attached between said rotatable gears G9 and G10, a gear G13 engaging with one (G6) of two fixed gears G5, G6 of said second input shaft X2, and a gear G15 connecting to the other fixed gear G5 of said second input shaft X2 through a gear G14 carried fixedly or rotatably on said idle shaft $X_R$, are rotatably carried on said counter shaft Xs, a gear G16 engaging with one (G1) of said two gears G1, G2 of said sleeve $S_G$ rotatably fitted on said first input shaft X1 is fixedly carried on said counter shaft Xs, a gear G17 engaging with said fixed gear G4 of said first input shaft X1 is rotatably carried on said counter shaft, and two couplings C3, C4 to fix selectively said three rotatable gears G13, G15, G17 to said counter shaft Xs are attached, and further, said gear G17 of said counter shaft Xs engaging with said fixed gear G4 of said first input shaft X1 and said coupling C4 of said counter shaft Xs are arranged in a side space of said output gear G12 of said output shaft Xo.

Since said two gears G1, G2 are carried on said sleeve $S_G$ fitted rotatably on said first input shaft X1, the shaft length of the bearing part of said sleeve $S_G$ on which said gears G1, G2 are carried can be enlarged to increase the bearing volume of said sleeve $S_G$ on which said gears are carried, hence, the durability of said transmission can be improved.

Furthermore, in the case where the diameter of one (G1) of said gears is settled to be desirably-larger than the diameter of the other gear G2, the gear ratio can be adjusted without changing the distance between said first input shaft X1 and said output shaft Xo and the distance between said first input shaft X1 and said counter shaft Xo, so that the diameter of each gear can be settled without the limitations of the gear ratio.

DESCRIPTION OF NOTATIONS
1 Transmission
2 Engine
3 Tire
4 Differential gear
X1 First input shaft
X2 Second input shaft
Xo Output shaft
Xs Counter shaft
$X_R$ Idle shaft
D1 First clutch
D2 Second clutch
G1–G17 Gears
C1~C4 Couplings
$S_G$, S1~S4 Sleeves
H1–H7 Hubs

PREFERRED EMBODIMENT OF THE INVENTION

Figure 1:
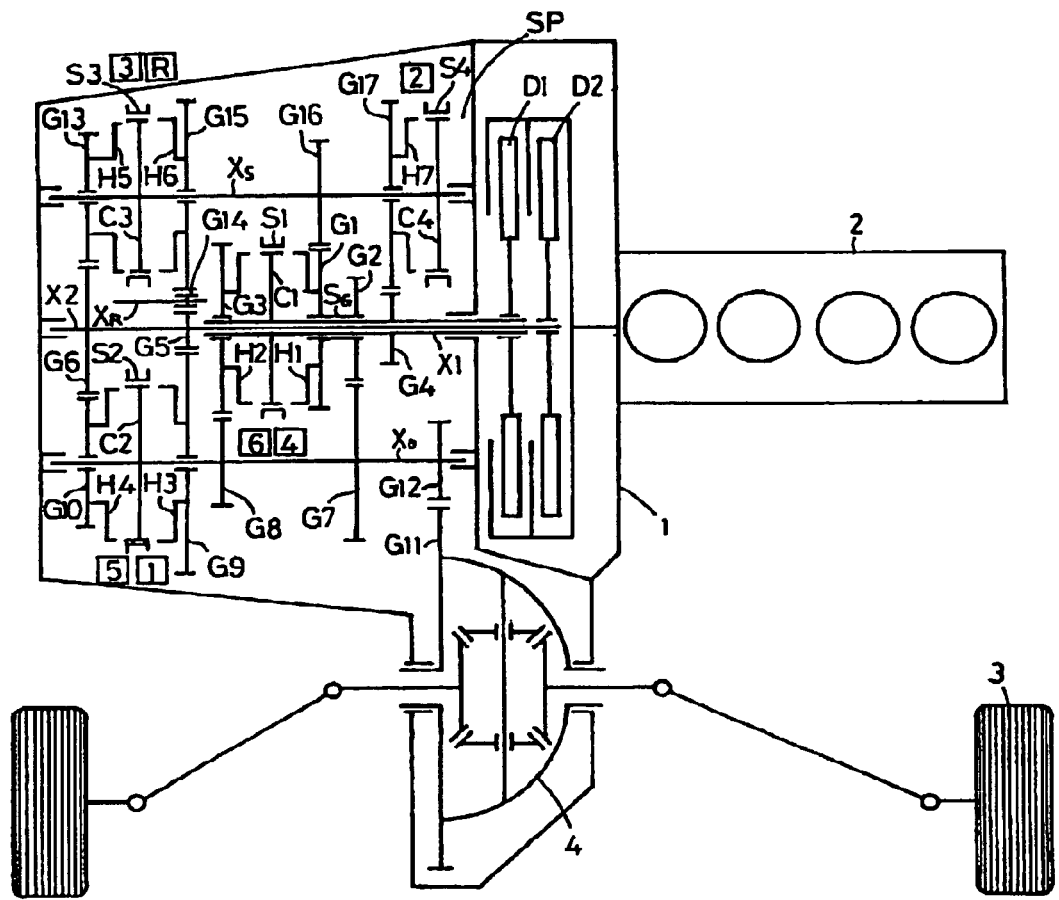
FIG. 1 is a descriptive drawing that shows an embodiment of this invention.

The present invention is described herein referring to an embodiment shown in FIG. 1. In said embodiment, a twin-clutch type six-speed automotive transmission (1) as shown in FIG. 1 is illustrated.

As shown in FIG. 1, said six-speed transmission (1) has a hollow, tube-like first input shaft X1, a second input shaft X2 inserted in said first input shaft X1, an output shaft Xo, a counter shaft Xs, and an idle shaft $X_R$, and a first clutch D1 and a second clutch D2 are connected respectively to said first input shaft X1 and said second input shaft X2 to transmit power from an engine (2) to said shafts X1, X2.

Two drive gears G1, G2 are carried on a sleeve $S_G$ and said sleeve $S_G$ is fitted rotatably on said first input shaft X1, a drive gear G3 for the 6th speed is rotatably carried on said first input shaft X1, a drive gear G4 for the $2^{nd}$-speed is fixedly carried on said first input shaft X1, said gears G1, G3 have hubs H1, H2 respectively, and a coupling C1 having a sleeve S1 is attached between said gears G1 and G3, and the diameter of one. (G1) of said gears is settled to be larger than the diameter of the other gear G2. Drive gears, G5, for the 1st speed and G6 for the $3^{rd}$-speed or $5^{th}$-speed are fixedly carried on said second input shaft X2 respectively.

Driven gears G7, G8, for the $4^{th}$-speed and $6^{th}$-speed engaging respectively with the other gear G2 of said sleeve $S_G$ fitted rotatably on said first input shaft X1 and the $6^{th}$ speed drive gears G3, are fixedly carried on said output shaft Xo, driven gears G9, G10 for the $1^{st}$-speed and $5^{th}$-speed engaging respectively with the $1^{st}$-speed, and the 3rd speed or $5^{th}$-speed gears G4, G6 of said second input shaft X2 are rotatably carried on said output shaft Xo, an output gear G12 engaging with a gear G11 of a differential gear (4) to transmit power to the tire (3) is fixedly carried on said output shaft Xo, furthermore, said gears G9, G10 have hubs H3, H4 respectively and a coupling C2 having a sleeve S2 is attached between said gears G9 and G10. Further, said output gear G12 is arranged on the most-clutch side.

A driven gear G13 for the $3^{rd}$-speed engaging with said gear G6 of said second input shaft X2, and a driven gear G15 for reverse connecting to said gear G5 of said second input shaft X2 through a gear G14 fixedly carried on said idle shaft $X_R$, are rotatably carried on said counter shaft Xs, a gear G16 engaging with said one (G1) of said gears of said sleeve $S_G$ fitted rotatably on said first input shaft X1 is fixedly carried on said counter shaft Xs, a driven gear G17 for the $2^{nd}$-speed engaging with said gear G4 of said first input shaft X1 is rotatably carried on said counter shaft Xs, said gears G13, G15 have hubs H5, H6 respectively, a coupling C3 having a sleeve S3 is attached between said gears G13 and G15, said gear G17 has a hub H7, and a coupling C4 having a sleeve S4 is attached to said gear G17.

Further, said gear G17 and said coupling C4 attached to said gear G17 are arranged in the side space SP of said output gear G12 of said output shaft Xo.

In this invention, said gear G14 of said idle shaft $X_R$, may be rotatably carried on said idle shaft $X_R$.

As described above, by carrying said two gears G1, G2 on said sleeve $S_G$ fitted rotatably on said input shaft X1, the shaft length of the bearing part of said sleeve $S_G$ carrying said gears G1, G2 can be enlarged to increase the bearing volume of said sleeve $S_G$ carrying said gears G1, G2, so that the durability of said transmission (1) can be improved.

Furthermore, in a case where the diameter of one(G1) of gears is adjusted to be larger than the diameter of the other gear G2, the gear ratio can also be adjusted without changing the distance between said first input shaft X1 and said output shaft Xo and the distance between said first input shaft X1 and said counter shaft Xs, so that the diameter of each gear can be settled without the limitations of the gear ratio.

As described above, since the diameter of each gear can be settled without the limitations of the gear ratio, the diameter of the 2nd speed drive gear G4 can be settled to be large, although said 2nd speed drive gear G4 is for a low speed, so that the diameter of said first input shaft X1 can also be settled to be large, according to the diameter of said gear G4, and accordingly, the diameter of said second input shaft X2, inserted in said hollow first input shaft X1, can be settled to be even larger, and the durability of said transmission (1) can be improved, ensuring the mechanical strength of said second input shaft X2.

Furthermore, since the gear ratio can be adjusted without changing the distance between shafts, said gear G6 of said second input shaft X2 can be used as the drive gear both for the 3rd speed and 5th speed to save space along the shaft equivalent to that of a pair of gears, so that the size of said transmission (1) along said shaft does not increase, even if the shaft length of the bearing part of said sleeve $S_G$ is built larger.

The action of said transmission (1) is illustrated bellow.

[$1^{st}$ Speed]

Said sleeve S2 is slid toward the $1^{st}$ speed driven gear G9 to connect said coupling C2 and said hub H3 of said gear G9, and the rotation of said second input shaft X2 is transmitted to said output shaft Xo through the $1^{st}$ speed driven gear G9 from the $1^{st}$ speed drive gear G5, and the rotation of said output shaft Xo is transmitted to said gear G11 of said differential gear (4) through said output gear G12, to attain $1^{st}$ speed.

[$2^{nd}$ Speed]

Said sleeve S4 is slid toward the $2^{nd}$ speed driven gear G17 to connect said coupling C4 and said hub H7 of said gear G17, and the rotation of said first input shaft X1 is transmitted to said counter shaft Xs through the $2^{nd}$ speed driven gear G17 from the $2^{nd}$ speed drive gear G4, and further transmitted to said sleeve $S_G$ through one (G1) of said gears of said sleeve $S_G$ of said first input shaft X1 from said gear G16 of said counter shaft Xs, and then transmitted to said output shaft Xo through said gear G7 of said output shaft Xo from the other gear G2 of said sleeve $S_G$, and the rotation of said output shaft Xo is transmitted to said gear G11 of said differential gear (4) through said output gear G12, to attain $2^{nd}$ speed.

[$3^{rd}$ Speed]

Said sleeve S3 is slid toward the $3^{rd}$ speed driven gear G13 to connect said coupling C3 and said hub H5 of said gear G13, and the rotation of said second input shaft X2 is transmitted to said counter shaft Xs through the $3^{rd}$ speed driven gear G13 from the $3^{rd}$ or the 5th speed drive gear G6, and further transmitted to said sleeve $S_G$ through one (G1) of gears of said sleeves $S_G$ of said first input shaft X1 from said gear G16 of said counter shaft Xs, and further transmitted to said output shaft Xo through said gear G7 of said out put shaft Xo from the other gear G2 of said sleeve $S_G$, and the rotation of said output shaft Xo is transmitted to said gear G11 of said differential gear (4) through said output gear G12, to attain $3^{rd}$ speed.

[$4^{th}$ Speed]

Said sleeve S1 is slid toward one (G1) of said gears of said sleeve $S_G$ of said first input shaft X1 to connect said coupling C1 and said hub H1 of said gear G1, and the rotation of said first input shaft X1 is transmitted to said sleeve $S_G$ through one (G1) of said gears of said sleeve $S_G$ of said first input shaft X1, and further transmitted to said output shaft Xo through said gear G7 of said output shaft Xo from the other gear G2 of said sleeve $S_G$, and the rotation of said output shaft Xo is transmitted to said gear G11 of said differential gear (4) through said output gear G12, to attain $4^{th}$ speed.

[$5^{th}$ Speed]

Said sleeve S2 is slid toward 5-speed driven gear G10 to connect said coupling C2 and said hub H4 of said gear G10, and the rotation of said second input shaft X2 is transmitted to said output shaft Xo through the $5^{th}$ speed driven gear G10 from the 3rd or the $5^{th}$ speed drive gear G6, and the rotation of said output shaft Xo is transmitted to said gear G11 of said differential gear (4) through said output gear G12, to attain $5^{th}$ speed.

[$6^{th}$ Speed]

Said sleeve S1 is slid toward the $6^{th}$ speed drive gear G3 to connect said coupling C1 and hub H2 of said gear G3, and the rotation of said first input shaft X1 is transmitted to said output shaft Xo through the $6^{th}$ speed driven gear G8 from the $6^{th}$ speed drive gear G3, and the rotation of said output shaft Xo is transmitted to said gear G11 of said differential gear (4) through said output gear G12, to attain $6^{th}$ speed.

[Reverse]

Said sleeve G3 is slid toward said reverse driven gear G15 to connect said coupling C3 and said hub H6 of said gear G15, and the rotation of said second input shaft X2 is transmitted to said counter shaft Xs through said reverse driven gear G15 being reversed by said gear G14 of said idle shaft $X_R$ from said gear G5 of said second input shaft X2, and then transmitted to said sleeve $S_G$ through one (G1) of said gears of said sleeves $S_G$ of said first input shaft X1 from said gear G16 of said counter shaft Xs, and then further transmitted to said output shaft Xo through said gear G7 of said output shaft Xo from the other gear G2 of said sleeve $S_G$, and the rotation of said output shaft Xo is transmitted to said gear G11 of said differential gear (4) through said output gear G12, to attain reverse.

Figure 2:
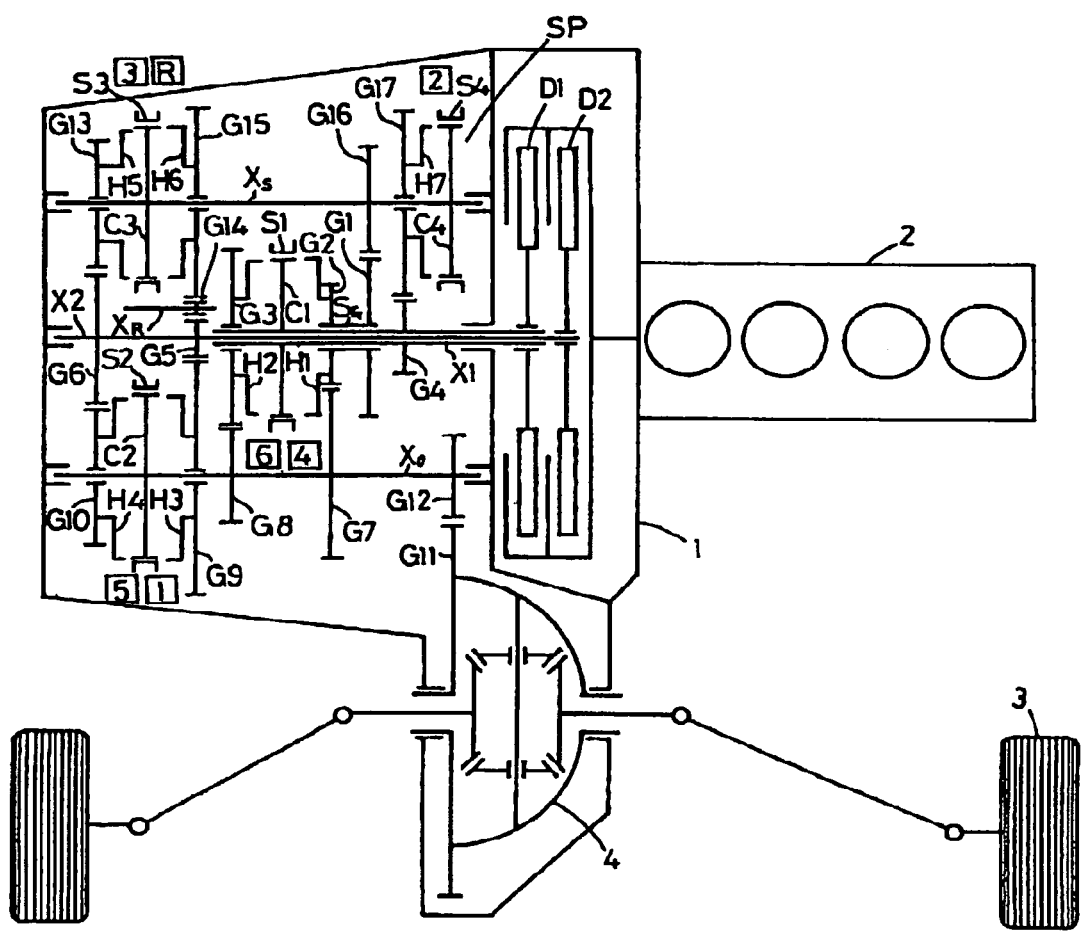
FIG. 2 is a descriptive drawing that shows another embodiment of this invention.
Figure 3:
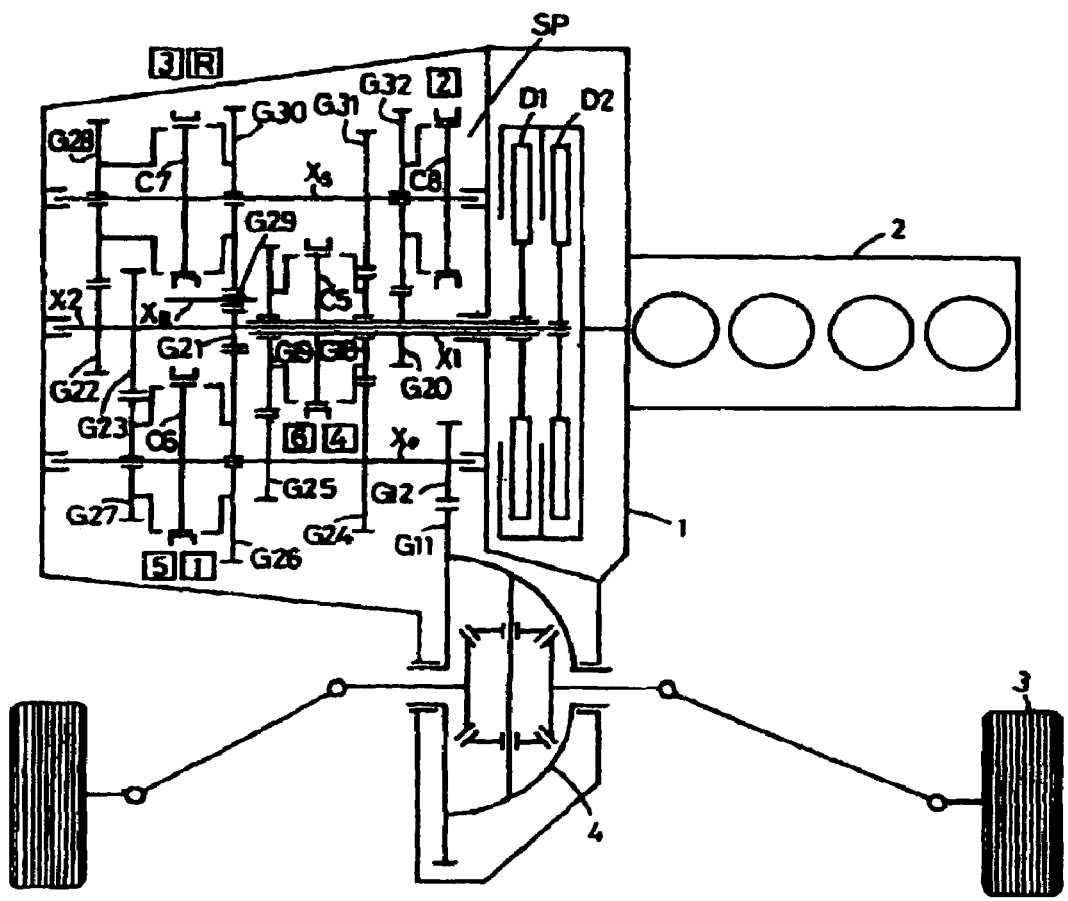
FIG. 3 is a descriptive drawing that shows a prior art.

In addition to this embodiment, as shown in FIG. 2, a hub H1 may be attached to the other gear G2 of said sleeve $S_G$ of said first input shaft X1 and a coupling C1 having a sleeve S1 may be attached between said gears G2 and G3. In this case, to attain 4th speed, said sleeve S1 is slid toward the other gear G2 of said sleeve $S_G$ of said first input shaft X1 to connect said coupling C1 and said hub H1 of said gear G2, and the rotation of said first input shaft X1 is transmitted to said output shaft Xo through said gear G7 of said output shaft Xo from the other gear G2 of said sleeve $S_G$ of said first input shaft X1, and then the rotation of said output shaft Xo is transmitted to said gear G11 of said differential gear (4) through said output gear G12, attaining $4^{th}$ speed.

INDUSTRIAL UTILITY

In the present invention, the mechanical strength of the gear and the bearing volume can be ensured without enlarging the transmission, improving the durability thereof.

What is claimed is:

1. A transmission having a first input shaft connecting to a first clutch, a second input shaft, inserted in said first input shaft, connecting to a second clutch, an output shaft, a counter shaft and an idle shaft, wherein a sleeve on which two gears are carried is rotatably fitted on said first input shaft, a gear is rotatably carried on said first input shaft, and a gear is fixedly carried on said first input shaft, and further, a coupling to fix selectively one of said rotatable gears of said sleeve and said rotatable gear of said first input shaft to said first input shaft is attached between said rotatable gears, two gears are fixedly carried on said second input shaft, two gears engaging with the other rotatable gear of said sleeve and said rotatable gear of said first input shaft are respectively fixedly carried on said output shaft, two gears respectively engaging with said two fixed gears of said second input shaft are rotatably carried on said output shaft, an output gear connecting to a differential gear is fixedly carried on said output shaft on the most-clutch side, and further, a coupling to fix selectively said two rotatable gears to said output shaft is attached between said rotatable gears, a gear engaging with one of two fixed gears of said second input shaft, and a gear connecting to the other fixed gear of said second input shaft through a gear carried fixedly or rotatably on said idle shaft, are rotatably carried on said counter shaft, a gear engaging with one of said two gears of said sleeve rotatably fitted on said first input shaft is fixedly carried on said counter shaft, a gear engaging with said fixed gear of said first input shaft is rotatably carried on said counter shaft, and two couplings to fix selectively said three rotatable gears to said counter shaft are attached to said rotatable gears, and further, said gear of said counter shaft engaging with said fixed gear of said first input shaft and said coupling of said counter shaft, are arranged in a side space of said output gear of said output shaft.

* * * * *